United States Patent
Oh et al.

(10) Patent No.: US 9,287,041 B2
(45) Date of Patent: Mar. 15, 2016

(54) COIL DEVICE, AND WIRELESS POWER TRANSMITTER AND WIRELESS POWER RECEIVER HAVING THE SAME

(71) Applicant: SAMSUNG ELECTRO-MECHANICS CO., LTD., Suwon-Si, Gyeonggi-Do (KR)

(72) Inventors: Soon Tack Oh, Suwon-Si (KR); Chang Soo Kang, Suwon-Si (KR); Jae Suk Sung, Suwon-Si (KR); Sung Uk Lee, Suwon-Si (KR); Hyun Keun Lim, Suwon-Si (KR); Si Hyung Kim, Suwon-Si (KR); Chul Gyun Park, Suwon-Si (KR); Ki Won Chang, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 209 days.

(21) Appl. No.: 14/214,162

(22) Filed: Mar. 14, 2014

(65) Prior Publication Data

US 2015/0179335 A1    Jun. 25, 2015

(30) Foreign Application Priority Data

Dec. 20, 2013   (KR) .................. 10-2013-0160325

(51) Int. Cl.
  *H01M 10/46*  (2006.01)
  *H01F 38/14*  (2006.01)
  *H01F 27/02*  (2006.01)
  *H01F 27/28*  (2006.01)
  *H02J 5/00*   (2006.01)
  *H02J 7/02*   (2006.01)

(52) U.S. Cl.
  CPC .............. *H01F 38/14* (2013.01); *H01F 27/02* (2013.01); *H01F 27/2823* (2013.01); *H02J 5/005* (2013.01); *H02J 7/025* (2013.01)

(58) Field of Classification Search
  CPC ......... H02J 5/005; H02J 7/355; H02J 7/0042; H02J 7/025
  USPC .......... 320/107, 108, 114, 115; 336/137, 183, 336/DIG. 2
  See application file for complete search history.

(56) References Cited

U.S. PATENT DOCUMENTS

| | | | |
|---|---|---|---|
| 2009/0096413 A1* | 4/2009 | Partovi et al. | ................. 320/108 |
| 2011/0018360 A1 | 1/2011 | Baarman et al. | |
| 2011/0241615 A1 | 10/2011 | Yeh | |
| 2013/0099730 A1 | 4/2013 | Yoon | |

FOREIGN PATENT DOCUMENTS

| | | |
|---|---|---|
| KR | 10-2010-0094197 A | 8/2010 |
| KR | 10-2013-0045087 A | 5/2013 |
| WO | WO 2013/103749 A2 | 7/2013 |

OTHER PUBLICATIONS

Extended European Search Report dated May 21, 2015 in corresponding European Patent Application No. 14275058.7.

* cited by examiner

*Primary Examiner* — Edward Tso
(74) *Attorney, Agent, or Firm* — NSIP Law

(57) ABSTRACT

A coil device may be capable of varying the gap of a coil so that several devices may be wirelessly charged simultaneously or a single device may be wirelessly charged with concentrated power. The coil device may include: a case having a reception space and varying a charging area upon a user's selection; and a coil part, having, in the reception space of the case, a coil body formed of a wound conductor having a predetermined length. A gap of the wound conductor of the coil body varies as the charging area of the case varies.

19 Claims, 7 Drawing Sheets

COIL DEVICE, AND WIRELESS POWER TRANSMITTER AND WIRELESS POWER RECEIVER HAVING THE SAME

CROSS-REFERENCE TO RELATED APPLICATION

This application claims the benefit of Korean Patent Application No. 10-2013-0160325 filed on Dec. 20, 2013, with the Korean Intellectual Property Office, the disclosure of which is incorporated herein by reference.

BACKGROUND

The present disclosure relates to a coil device used for wireless power transmission, a wireless power transmitter and a wireless power receiver having the same.

Electric and electronic devices are devices operated with electricity as the energy source thereof.

In order to operate an electric or an electronic device, electrical power, the energy source necessary to operate the device, has to be supplied thereto from the outside, unless the device has self-power generation capability.

Accordingly, in order to receive power from the outside, it is necessary for the electric or the electronic device to be equipped with a power transmission means to deliver power from an external power utility facility to the device.

Incidentally, wireless charging technology refers to a technology that transmits power for charging a battery wirelessly, without using a power cord or a connector for charging.

Previously, wireless charging technology has seen limited use, commonly in devices such as electric toothbrushes, home cordless telephones, and power tools.

Recently, due to explosive growth in the smartphone market, wireless charging technology has rapidly become widespread. Smartphones allow users to enjoy rich content and multimedia services anywhere and at anytime, but they suffer from short usage times, due to limited battery capacity.

Among other methods, a common means of realizing wireless charging is to use magnetic inductance or magnetic resonance, which uses electromagnetic energy coupling generated in a coil wound a number of times, as disclosed in the patent document below.

This is implemented as a device which is operated based on Faraday's law of induction; in which an electromagnetic field generated by a coil in which alternating current (AC) power or high-frequency current is flowing induces electromotive force at the output terminal of an adjacent coil. When a typical mobile phone, a smartphone, a digital camera, a tablet PC, a monitor, a laptop computer or the like, having a wireless charging receiver module embedded therein, is placed on a charging surface of a wireless charger having a wireless charging transmitter module configured therein, an analog circuit, a power circuit, a control circuit, a rectifying circuit, a charging circuit and the like, associated with charging, may be operated so as to charge a battery embedded in the device.

However, such a wireless charger may have a relatively large volume, and thus it may be inconvenient to store and carry, and it may be difficult to wirelessly charge several devices simultaneously therewith.

SUMMARY

An aspect of the present disclosure may provide a coil device capable of varying the gap between turns of a coil so that several devices may be charged wirelessly and simultaneously or a single device may be wirelessly charged with concentrated power, and a wireless power transmitter and a wireless power receiver having the same.

According to an aspect of the present disclosure, a coil device may include: a case having a reception space and varying a charging area upon a user's selection; and a coil part, having, in the reception space of the case, a coil body formed of a wound conductor having a predetermined length, wherein a gap between turns of the wound conductor of the coil body varies as the charging area of the case varies.

The case may include a first case face having the reception space; and at least one second case face having a reception space and extending from the first case face so as to vary the area of the case.

The coil part may include: a first coil block accommodated in the reception space of the first case face and formed of a part of the coil body formed of the wound conductor having the predetermined length; and at least one second coil block accommodated in the reception space of the second case face, electrically connected to the first coil block, and formed of the other part of the coil body formed of the wound conductor having the predetermined length.

The second case face may be coupled to the first case face and may vary the area of the case in a folding manner.

The second case face may be coupled to the first case face and may vary the area of the case in a sliding manner.

Turns of the wound conductor of the at least one second coil block may be disposed between turns of the wound conductor of the first coil block when the area of the case is reduced.

According to another aspect of the present disclosure, a wireless power transmitter may include: a case having a reception space and varying a charging area upon a user's selection; a coil part, having, in the reception space of the case, a coil body formed of a wound conductor having a predetermined length, wherein a gap between turns of the wound conductor of the coil body varies as the charging area of the case varies such that the coil part wirelessly transmits power; and a power supplying unit supplying power to the coil part.

The power supplying unit may include: a power conversion unit converting alternating current power into direct current power having a predetermined level; a driving unit receiving the direct current power from the power conversion unit to wirelessly transmit the power using the coil part; and a control unit controlling electrical energy transmitted using the coil part depending on conditions of power supplied to the coil part.

According to another aspect of the present disclosure, a wireless power receiver may include: a case having a reception space and varying a charging area upon a user's selection; a coil part, having, in the reception space of the case, a coil body formed of a wound conductor having a predetermined length, wherein a gap between turns of the wound conductor of the coil body varies as the charging area of the case varies such that the coil part wirelessly receives power; and a connection unit transmitting the power received in the coil part to an external device.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1A:
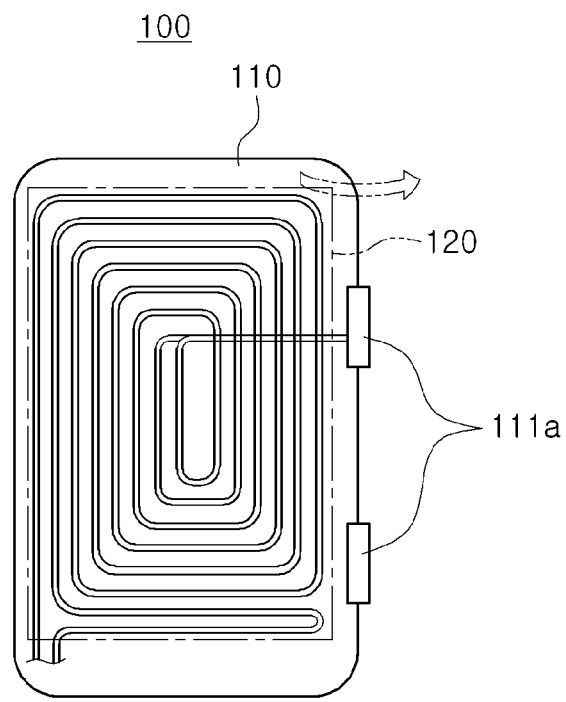
FIGS. 1A and 1B are views schematically illustrating a coil device according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1B:
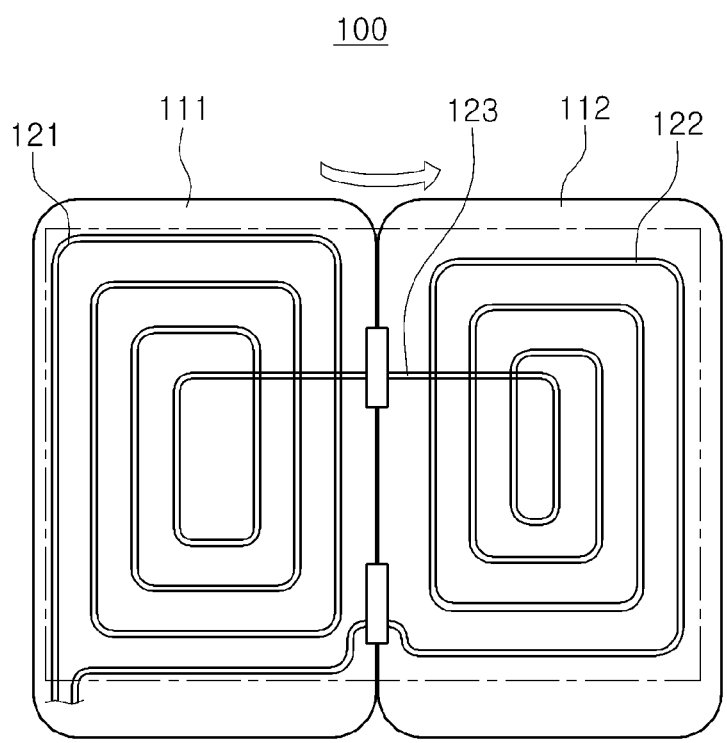

FIGS. 1A and 1B are views schematically illustrating a coil device according to an exemplary embodiment of the present disclosure.

Referring to FIGS. 1A and 1B, the coil device 100 according to the exemplary embodiment may include a case 110 and a coil part 120.

The case 110 may have a reception space therein and may include a first case face 111 and a second case face 112 to vary the area of a charging area. The charging area may be varied by varying the area of the case. Although only one first side 111 and only one second case face 112 are shown in the drawing, the numbers of the case faces are not limited to one.

In the reception space of the case 110, the coil part 120 may be formed. The coil part 120 may have a coil body formed of a predetermined conductor. The coil body may be formed by bending the conductor into various shapes, such as spiral shape and a meandering line shape. Although in the drawings, the coil part 120 is depicted as having a spiral shape, the shape of the coil part 120 is not limited thereto and may have various shapes as necessary.

As shown FIG. 1B, at least one second case face 112 may be extended from the first case face 111 so as to vary the area of the case, and accordingly, the gap between the conductors of the coil part 120 in the reception space of the case 110 may vary in width.

That is, the coil part 120 may include a first coil block 121 accommodated in the first case face 111, and at least one second coil block 122 accommodated in the second case face 112. The second coil block 122 is electrically connected to the first coil block 121, and when the second case face 112 lies on, is stacked on or slides in the first case face 111, the area of the case is reduced, so that the second coil block 122 and the first coil block 121 may form a single coil body. When the second case face 112 is extended from the first case face 111 such that the area of the case is enlarged, the second coil block 122 and the first coil block 121 may have respective coil bodies, which are predetermined. For example, as shown, the second coil block 122 may form a coil body having a spiral shape together with the first coil block 121, each of the second coil block 122 and the first coil block 121 may form a coil body having a spiral shape. To this end, a coil connection part 123 having variable length may be formed between the second coil block 122 and the first coil block 121.

Figure 2A:
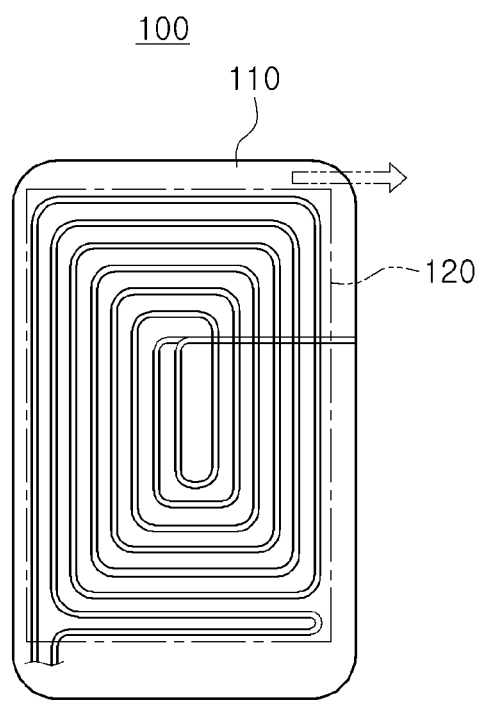
FIGS. 2A and 2B are views schematically illustrating a coil device according to another exemplary embodiment of the present disclosure.
Figure 2B:
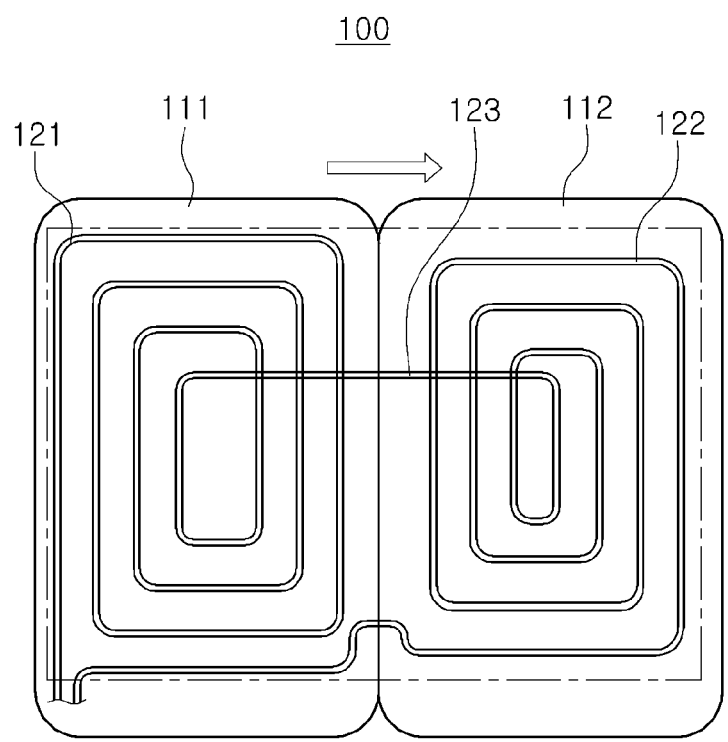
Figure 3A:
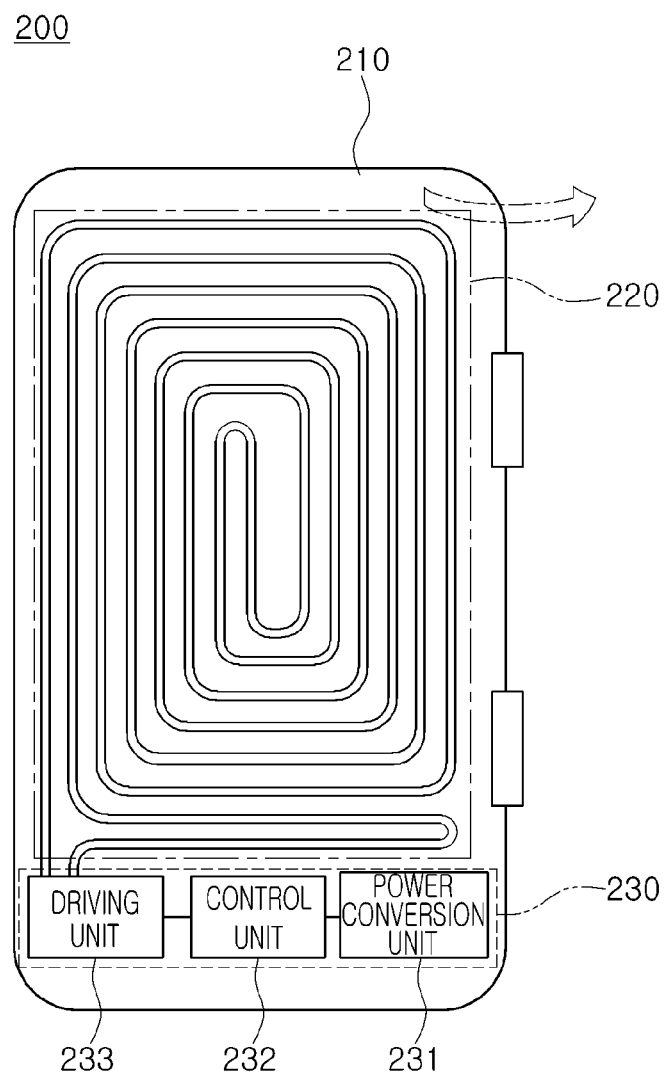
FIGS. 3A, 3B, 4A and 4B are views schematically illustrating the configuration of a wireless power transmitter according to an exemplary embodiment of the present disclosure.
Figure 3B:
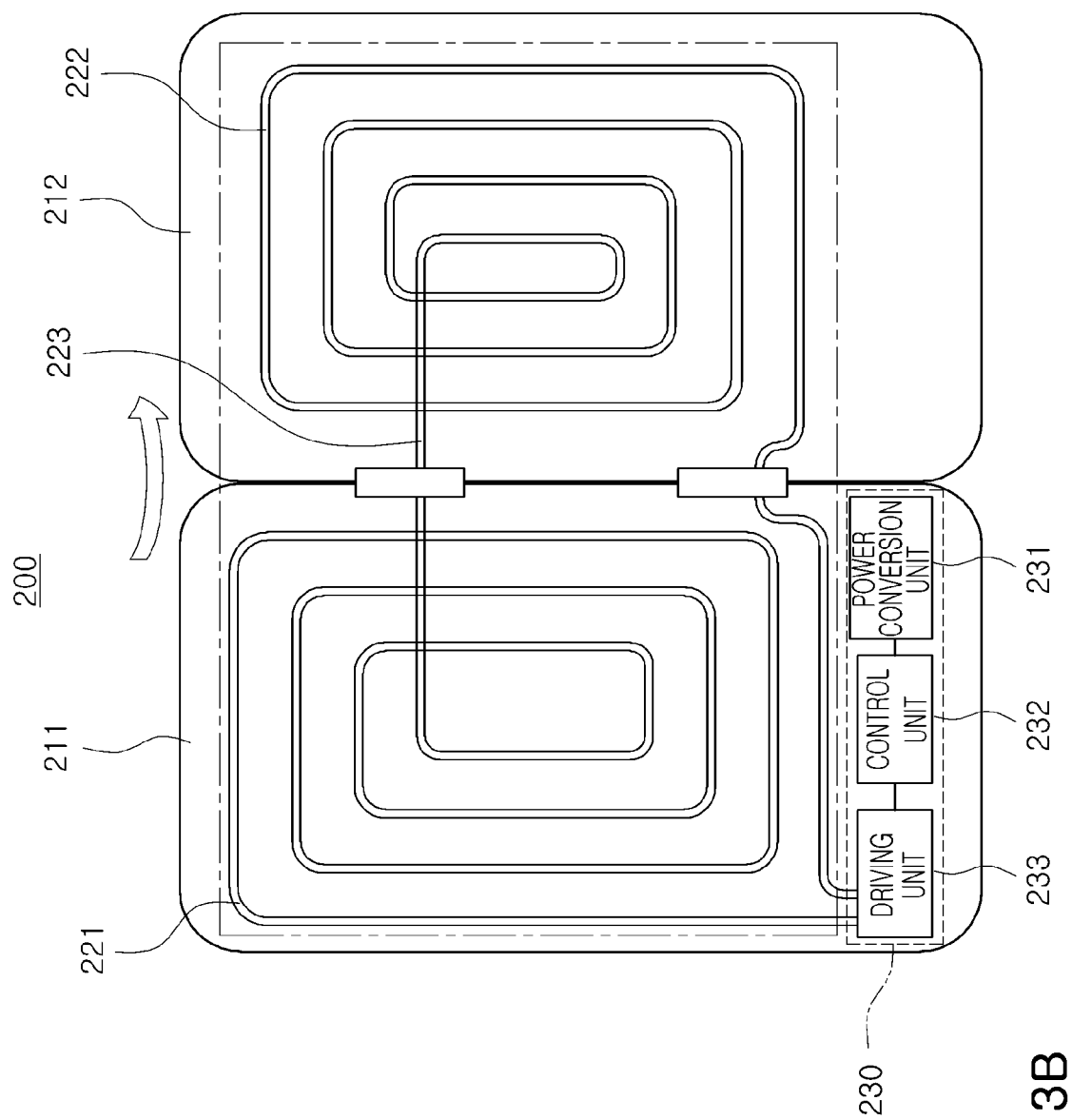
Figure 4A:
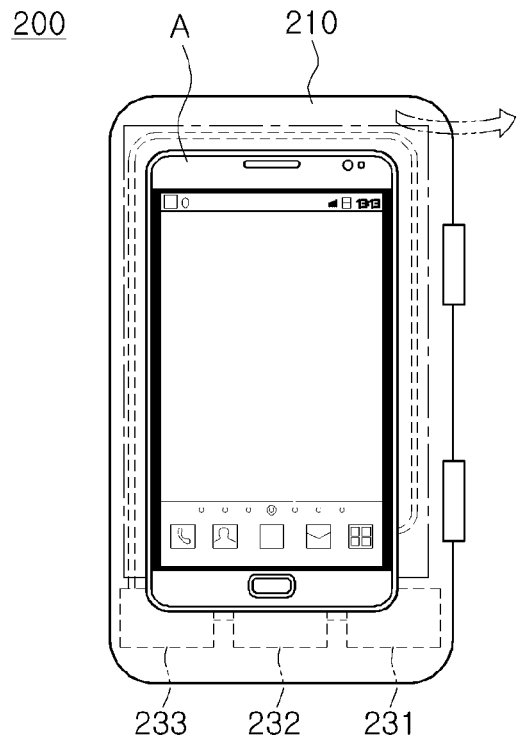
Figure 4B:
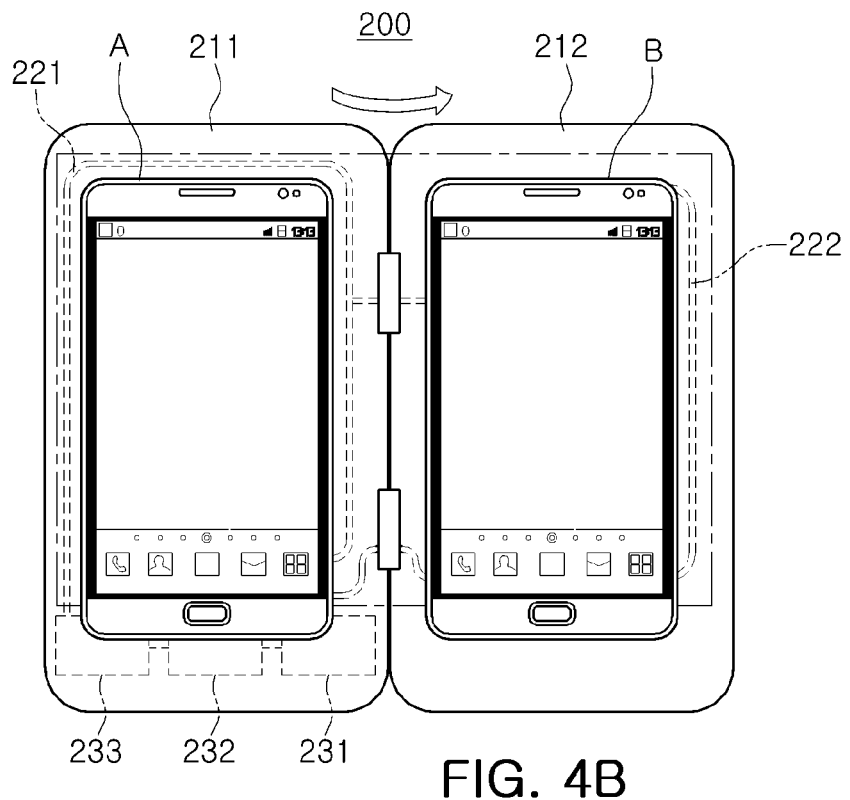
Figure 5A:
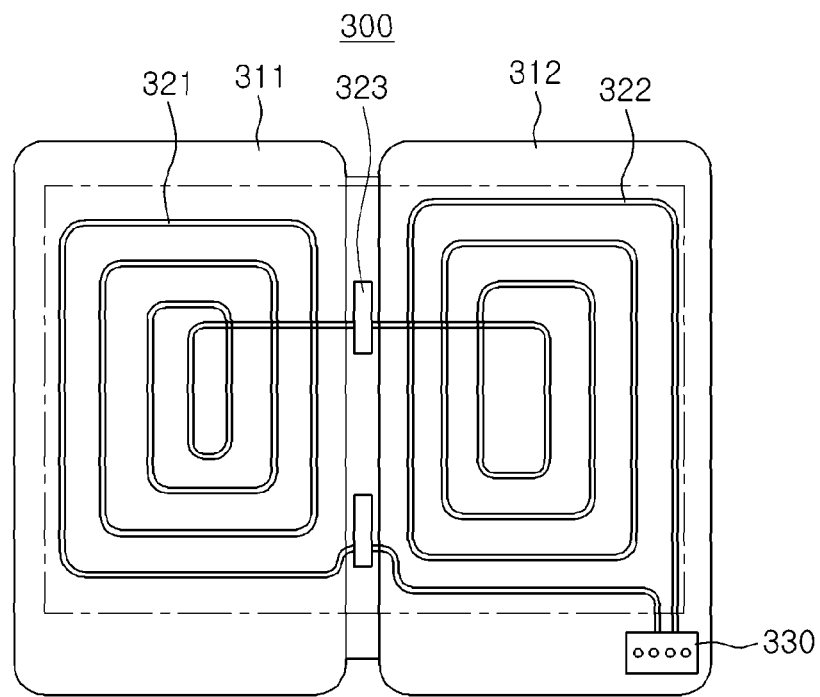
FIGS. 5A through 5D are views schematically illustrating a wireless power receiver according to an exemplary embodiment of the present disclosure.
Figure 5B:
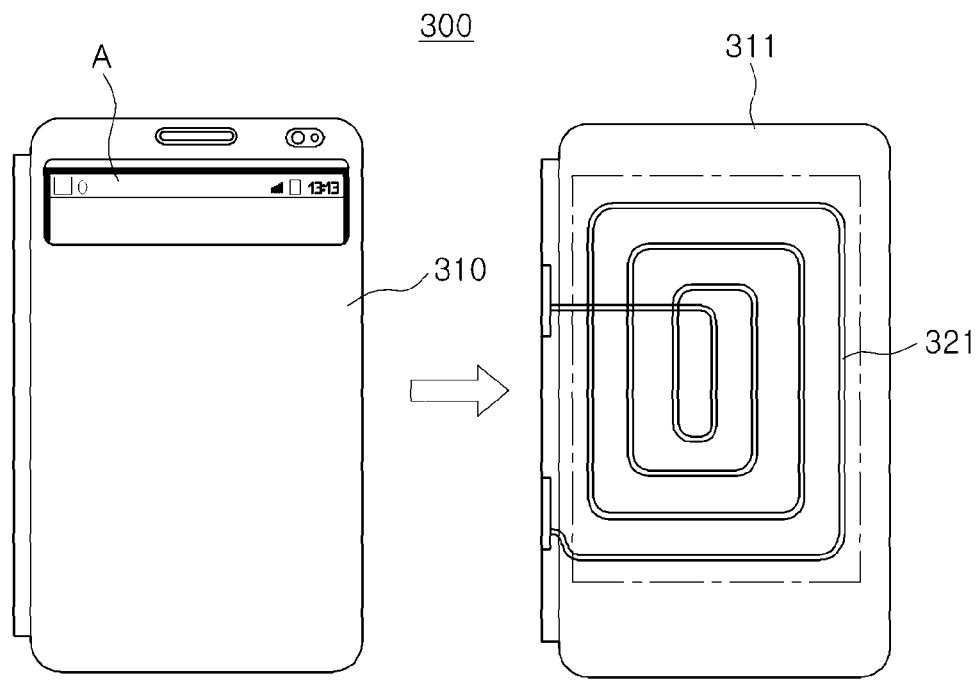
Figure 5C:
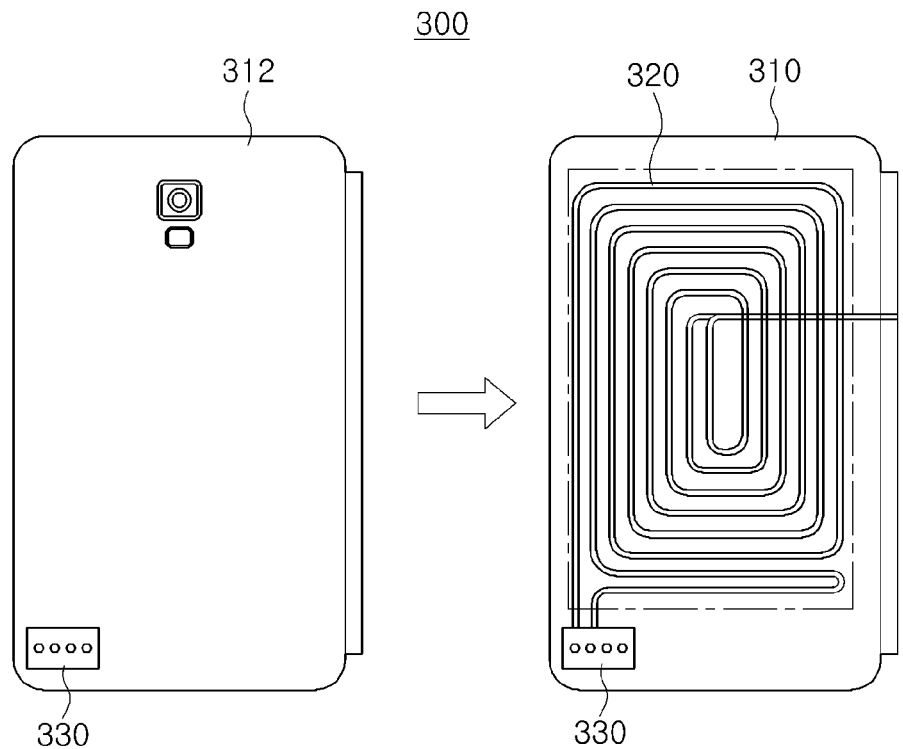
Figure 5D:
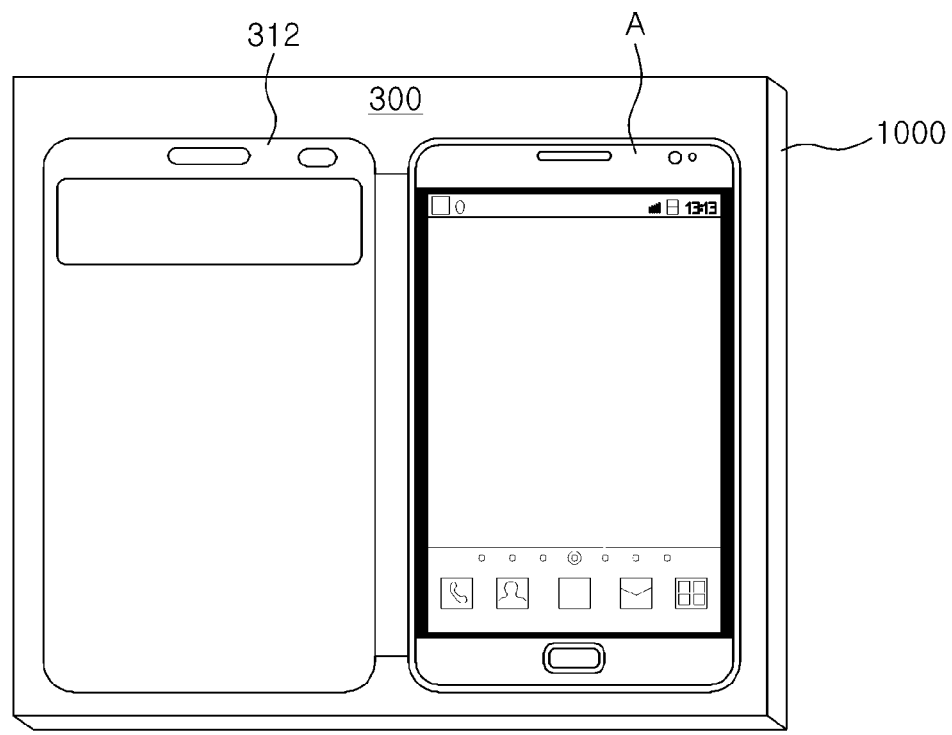

FIGS. 2A and 2B are views schematically illustrating a coil device according to another exemplary embodiment of the present disclosure.

Referring to FIG. 2A, when the area of the case is reduced, the area of the case may be reduced in a folding manner, such as that a second case face 112 may be folded over or stacked on a first case face 111. Further, the area of the case face may be enlarged when the second case face 112 is unfolded. To this end, a folding portion may be formed between the first case face 111 and the second case face 112.

Referring to FIG. 2B, the area of the case may be enlarged in a sliding manner such as that the second case face 112 may slide out of and be extended from the first case face 111. Further, the second case face 112 may slide into the first case face, such that the area of the case may be reduced.

FIGS. 3A, 3B, 4A and 4B are views schematically illustrating the configuration of a wireless power transmitter according to an exemplary embodiment of the present disclosure.

Referring to FIGS. 3A, 3B, 4A and 4B, the wireless power transmitter according to the exemplary embodiment may include a case 210, a coil part 220, and a power supplying unit 230.

The case 210 and the coil part 220 of the wireless power transmitter 200 in this exemplary embodiment are identical to those described above with respect to the coil device 100, and redundant descriptions will not be repeated hereinafter. When the area of the case 210 is enlarged, however, instead of widening the gap between turns of the coil of the coil part 220, the area of the region in which the coil of the coil part 220 is located is enlarged accordingly, and devices A and B are placed on the first and second case faces 211 and 212 of the case 210, respectively, such that power from the power supplying unit 230 is wirelessly transmitted to the at least two devices A and B, allowing for wireless charging thereof. When the area of the case 210 is reduced, the area of the region where the coil of the coil part 220 is located is also reduced or the gap of the coil is narrowed, such that power may be concentrated on the device A. Accordingly, the single device A may be wirelessly supplied with power to be rapidly charged.

The power supplying unit 230 may supply power to the devices A and B using the coil part 220 through magnetic inductance or magnetic resonance. When power is supplied though magnetic resonance, the power supplying unit 230 may include a power conversion unit 231, a control unit 232, and a driving unit 233.

The power conversion unit 231 may convert an AC power into a predetermined DC power.

The driving unit 233 may drive the coil part 220 so that the DC power from the power conversion unit 231 is transmitted using the coil part through magnetic resonance.

The control unit 232 may detect the voltage applied to the coil part 220 and the current flowing in the coil part 220 so as to adjust the electrical energy.

FIGS. 5A through 5D are views schematically illustrating a wireless power receiver according to an exemplary embodiment of the present disclosure.

Referring to FIGS. 5A through 5D, the wireless power receiver according to the exemplary embodiment may include a case 310, a coil part 320, and a transmission unit 330.

The case 310 and the coil part 320 of the wireless power receiver 300 in this exemplary embodiment is identical to those described above with respect to the coil device 100, and redundant descriptions will not be repeated. When the area of the case 310 is enlarged, however, instead of widening the gap between turns of the coil 320, the area of the region in which the coil of the coil part 220 is located is enlarged accordingly, such that a large amount of power may be wirelessly received when the wireless power receiver 300 wirelessly receives power from a power transmission device 1000 having a relatively large area.

On the contrary, when the area of the case 310 is reduced, the area of the region in which the coil of the coil part 220 is located is reduced accordingly, but the gap between turns of the coil is narrowed, so that the transmitted power may be concentrated.

If the case 310 is a case of a mobile phone, for example, the coil part 320 may consist of first and second coil blocks 321 and 322 on the front side 311 and rear side 312 of the case of the mobile phone, respectively, such that power is wirelessly received to be transmitted to the device A through the transmission unit 330.

As set forth above, according to exemplary embodiment of the present disclosure, several devices may be charged wirelessly and simultaneously or a single device may be wirelessly charged with concentrated power. Further, the coil device is implemented in a folding manner or a sliding manner, such that an electronic device employing it may be convenient to carry and use.

While exemplary embodiments have been shown and described above, it will be apparent to those skilled in the art that modifications and variations could be made without departing from the spirit and scope of the present disclosure as defined by the appended claims.

What is claimed is:

1. A coil device, comprising:
a case having a reception space and varying a charging area upon a user's selection; and
a coil part, having, in the reception space of the case, a coil body formed of a wound conductor having a predetermined length, wherein a gap between turns of the wound conductor of the coil body varies as the charging area of the case varies.

2. The coil device of claim 1, wherein the case includes:
a first case face having the reception space; and
at least one second case face having a reception space and extending from the first case face so as to vary the area of the case.

3. The coil device of claim 2, wherein the coil part includes:
a first coil block accommodated in the reception space of the first case face and formed of a part of the coil body formed of the wound conductor having the predetermined length; and
at least one second coil block accommodated in the reception space of the second case face, electrically connected to the first coil block, and formed of the other part of the coil body formed of the wound conductor having the predetermined length.

4. The coil device of claim 2, wherein the second case face is coupled to the first case face and varies the area of the case in a folding manner.

5. The coil device of claim 4, wherein the second case face is coupled to the first case face and varies the area of the case in a sliding manner.

6. The coil device of claim 3, wherein turns of the wound conductor of the at least one second coil block are disposed between turns of the wound conductor of the first coil block when the area of the case is reduced.

7. A wireless power transmitter, comprising:
a case having a reception space and varying a charging area upon a user's selection;
a coil part, having, in the reception space of the case, a coil body formed of a wound conductor having a predetermined length, wherein a gap between turns of the wound conductor of the coil body varies as the charging area of the case varies such that the coil part wirelessly transmits power; and
a power supplying unit supplying power to the coil part.

8. The wireless power transmitter of claim 7, wherein the case includes a first case face having the reception space; and at least one second case face having a reception space and extending from the first case face so as to vary the area of the case.

9. The wireless power transmitter of claim 8, wherein the coil part includes:
a first coil block accommodated in the reception space of the first case face and formed of a part of the coil body formed of the wound conductor having the predetermined length; and
at least one second coil block accommodated in the reception space of the second case face, electrically connected to the first coil block, and formed of the other part of the coil body formed of the wound conductor having the predetermined length.

10. The wireless power transmitter of claim 8, wherein the second case face is coupled to the first case face and varies the area of the case in a folding manner.

11. The wireless power transmitter of claim 10, wherein the second case face is coupled to the first case face and varies the area of the case in a sliding manner.

12. The wireless power transmitter of claim 9, wherein turns of the wound conductor of the at least one second coil block is disposed between turns of the wound conductor of the first coil block when the area of the case is reduced.

13. The wireless power transmitter of claim 7, wherein the power supplying unit includes:
a power conversion unit converting alternating current power into direct current power having a predetermined level;
a driving unit receiving the direct current power from the power conversion unit to wirelessly transmit the power using the coil part; and
a control unit controlling electrical energy transmitted using the coil part depending on conditions of power supplied to the coil part.

14. A wireless power receiver, comprising:
a case having a reception space and varying a charging area upon a user's selection;
a coil part, having, in the reception space of the case, a coil body formed of a wound conductor having a predetermined length, wherein a gap between turns of the wound conductor of the coil body varies as the charging area of the case varies such that the coil part wirelessly receives power; and
a connection unit transmitting the power received in the coil part to an external device.

15. The wireless power receiver of claim 14, wherein the case includes:
a first case face having the reception space; and
at least one second case face having a reception space and extending from the first case face so as to vary the area of the case.

16. The wireless power receiver of claim 15, wherein the coil part includes:
a first coil block accommodated in the reception space of the first case face and formed of a part of the coil body formed of the wound conductor having the predetermined length; and at least one second coil block accommodated in the reception space of the second case face, electrically connected to the first coil block, and formed of the other part of the coil body formed of the wound conductor having the predetermined length.

17. The wireless power receiver of claim 15, wherein the second case face is coupled to the first case face and varies the area of the case in a folding manner.

18. The wireless power receiver of claim 17, wherein the second case face is coupled to the first case face and varies the area of the case in a sliding manner.

19. The wireless power receiver of claim 16, wherein turns of the wound conductor of the at least one second coil block is disposed between turns of the wound conductor of the first coil block when the area of the case is reduced.

\* \* \* \* \*